United States Patent
Dowlatkhah

(10) Patent No.: US 8,601,218 B2
(45) Date of Patent: Dec. 3, 2013

(54) DATA CACHING IN CONSOLIDATED NETWORK REPOSITORY

(75) Inventor: Sangar Dowlatkhah, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/544,580

(22) Filed: Jul. 9, 2012

(65) Prior Publication Data

US 2012/0290795 A1  Nov. 15, 2012

Related U.S. Application Data

(63) Continuation of application No. 12/609,951, filed on Oct. 30, 2009, now Pat. No. 8,239,632.

(60) Provisional application No. 61/159,674, filed on Mar. 12, 2009.

(51) Int. Cl.
*G06F 12/00* (2006.01)
(52) U.S. Cl.
USPC .......................................................... 711/133
(58) Field of Classification Search
None
See application file for complete search history.

(56) References Cited

U.S. PATENT DOCUMENTS

| | | | |
|---|---|---|---|
| 6,505,241 B2 | 1/2003 | Pitts | |
| 6,601,090 B1 * | 7/2003 | Gurijala et al. | 709/213 |
| 7,720,819 B2 * | 5/2010 | Lazzaro et al. | 707/663 |
| 7,844,710 B2 | 11/2010 | Rathi | |
| 8,020,073 B2 | 9/2011 | Emma et al. | |
| 2005/0267901 A1 | 12/2005 | Irlen et al. | |
| 2008/0013533 A1 | 1/2008 | Bogineni et al. | |
| 2008/0222646 A1 | 9/2008 | Sigal et al. | |
| 2008/0270164 A1 | 10/2008 | Kidder et al. | |
| 2008/0306883 A1 | 12/2008 | Baffier et al. | |
| 2011/0173219 A1 | 7/2011 | Bent et al. | |
| 2012/0238292 A1 | 9/2012 | Walker et al. | |

OTHER PUBLICATIONS

OA dated Nov. 19, 2012 for U.S. Appl. No. 12/635,092, 20 pages.

* cited by examiner

*Primary Examiner* — Hiep Nguyen
(74) *Attorney, Agent, or Firm* — Turocy & Watson, LLP

(57) ABSTRACT

System(s) and method(s) are provided for caching data in a consolidated network repository of information available to mobile and non-mobile networks, and network management systems. Data can be cached in response to request(s) for a data element or request(s) for an update to a data element and in accordance with a cache retention protocol that establishes a versioning protocol and a set of timers that determine a period to elapse prior to removal of a version of the cached data element. Updates to a cached data element can be effected if an integrity assessment determines that recordation of an updated version of the data element preserves operational integrity of one or more network components or services. The assessment is based on integrity logic that establishes a set of rules that evaluate operational integrity of a requested update to a data element. Retention protocol and integrity logic are configurable.

20 Claims, 8 Drawing Sheets

DATA CACHING IN CONSOLIDATED NETWORK REPOSITORY

CROSS REFERENCE TO RELATED APPLICATION

This application is a continuation application of U.S. patent application Ser. No. 12/609,951, entitled "DATA CACHING IN CONSOLIDATED NETWORK REPOSITORY," filed on Oct. 30, 2009, now U.S. Pat. No. 8,239,632 the entirety of which is incorporated herein by reference. This application also claims the benefit of U.S. Provisional Application Ser. No. 61/159,674, entitled "CONSOLIDATED NETWORK REPOSITORY (CNR)," filed on Mar. 12, 2009, the entirety of which is incorporated herein by reference.

TECHNICAL FIELD

The subject disclosure relates generally to communication networks and, more specifically, to retaining data element(s) in cache storage associated with a consolidated network repository of information available to mobile and non-mobile networks.

BACKGROUND

Growth of wireless communication networks generally results in deployment of infrastructure that is primarily market based. Disparate markets have disparate service needs—e.g., metropolitan areas can have dramatically different service requirements than rural areas—and thus a telecommunication network can have a heterogeneous, location-specific telecommunication network that spans various radio technologies and services. In addition, as radio technologies advance, services provided wirelessly can rely on non-mobile networks, which further increases infrastructure heterogeneity of the telecommunication network. Moreover, as wireless communication becomes ubiquitous, subscriber mobility results in consumption of services and associated network data across a range of network systems and capabilities. Accordingly, reliable and efficient access to network data is a key component to perceived quality of service by subscribers and customer retention.

Data caching, or temporary storage of information in a computer memory, is a common mechanism to improve performance of a computing device by avoiding (i) time-consuming input/output (I/O) operation(s) to extract the information from a repository, typically different from the computer memory, or (ii) costly or inefficient reproduction, such as re-computation, of the information. Thus, data caching can be readily employed in various components of a wireless network. Yet, conventional implementations of data caching typically operate in a specific portions of network infrastructure and are application specific. Such features of typical data caching, the heterogeneous nature of wireless network deployments, and a dramatic mobility of a large segment of subscribers generally result in modest to negligible performance improvements to data access in current wireless networks.

SUMMARY

The following presents a simplified summary of the subject disclosure in order to provide a basic understanding of some aspects thereof. This summary is not an extensive overview of the various embodiments of the subject disclosure. It is intended to neither identify key or critical elements nor delineate any scope. Its sole purpose is to present some concepts of the subject disclosure in a simplified form as a prelude to the more detailed description that is presented later.

One or more embodiments provide system(s) and method(s) for caching data in a consolidated network repository of information available to mobile and non-mobile networks, and network management systems. Data can be cached in response to request(s) for a data element or request(s) for an update to a data element and in accordance with a cache retention protocol. Request(s) for a data element of an update to a data element can be received from a set of external networks, mobile or otherwise, that interface a protocol layer. The protocol layer includes various signaling protocols associated with various network components and services, and application data. The protocol layer delivers the request(s) to a data management layer in a format compatible with the source (network component, application server, etc.) of the request(s). The data management layer format the request in accordance with a predetermined signaling protocol and allows caching, as well as other data storage functionality in accordance with the predetermined protocol. Data management layer is functionally coupled to a consolidate storage layer, which is a distributed, heterogeneous data storage. The consolidated storage layer includes all or substantially all network data that can be access or generated by network components or application servers that can access the protocol layer or interface layer. In addition, consolidated storage layer also can include data related to network management systems, and components therein; such systems functionally coupled to the data manager layer.

With respect to caching, the cache retention establishes a versioning protocol and a set of timers that determine a period to elapse prior to removal of a version of the cached data element. In addition, a master record of a data element can be updated with a most recent version of cached data element if a retention timer expires. Updates to a cached data element can be effected if an integrity assessment determines that recordation of an updated version of the data element preserves operational integrity of one or more network components or services. The assessment is based on integrity logic that establishes a set of rules that evaluate operational integrity of a requested update to a data element. Retention protocol and integrity logic are configurable; a network component can supply a configuration or such configuration can be effected autonomously.

Aspects, features, or advantages of the subject disclosure can be exploited in substantially any or any wireless communication network (second-generation (2G), third-generation (3G), or fourth-generation (4G) network and variant thereof) and non-wireless communication network (broadband network, a cable network, a conventional Public Switched Telephone Network (PSTN), etc.). In addition, such aspects, features, or advantages can be realized irrespective of telecommunication radio technology or wireline technology. Examples of such radio technologies or wireless networks include Femtocell technology, Wi-Fi, Worldwide Interoperability for Microwave Access (WiMAX); Enhanced General Packet Radio Service (Enhanced GPRS); Third Generation Partnership Project (3GPP) Long Term Evolution (LTE); 3GPP Universal Mobile Telecommunications System (UMTS); Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); Global System for Mobile Communication (GSM) Enhanced Data Rate for GSM Evolution (EDGE) RAN or GERAN; UMTS Terrestrial Radio Access Network (UTRAN); or LTE Advanced.

Examples of wireline technology include fiber-optic backbone networks, digital subscriber line (DSL) networks, T1/E1-based networks, Ethernet backbone networks, etc. Aspects of the subject disclosure also can be advantageously exploited in legacy telecommunication technologies.

To the accomplishment of the foregoing and related ends, the subject disclosure, then, comprises the features hereinafter fully described. The following description and the annexed drawings set forth in detail certain illustrative aspects of the subject disclosure. However, these aspects are indicative of but a few of the various ways in which the principles of the subject disclosure can be employed. Other aspects, advantages and novel features of the invention will become apparent from the following detailed description of the subject disclosure when considered in conjunction with the drawings.

DETAILED DESCRIPTION

Figure 1:
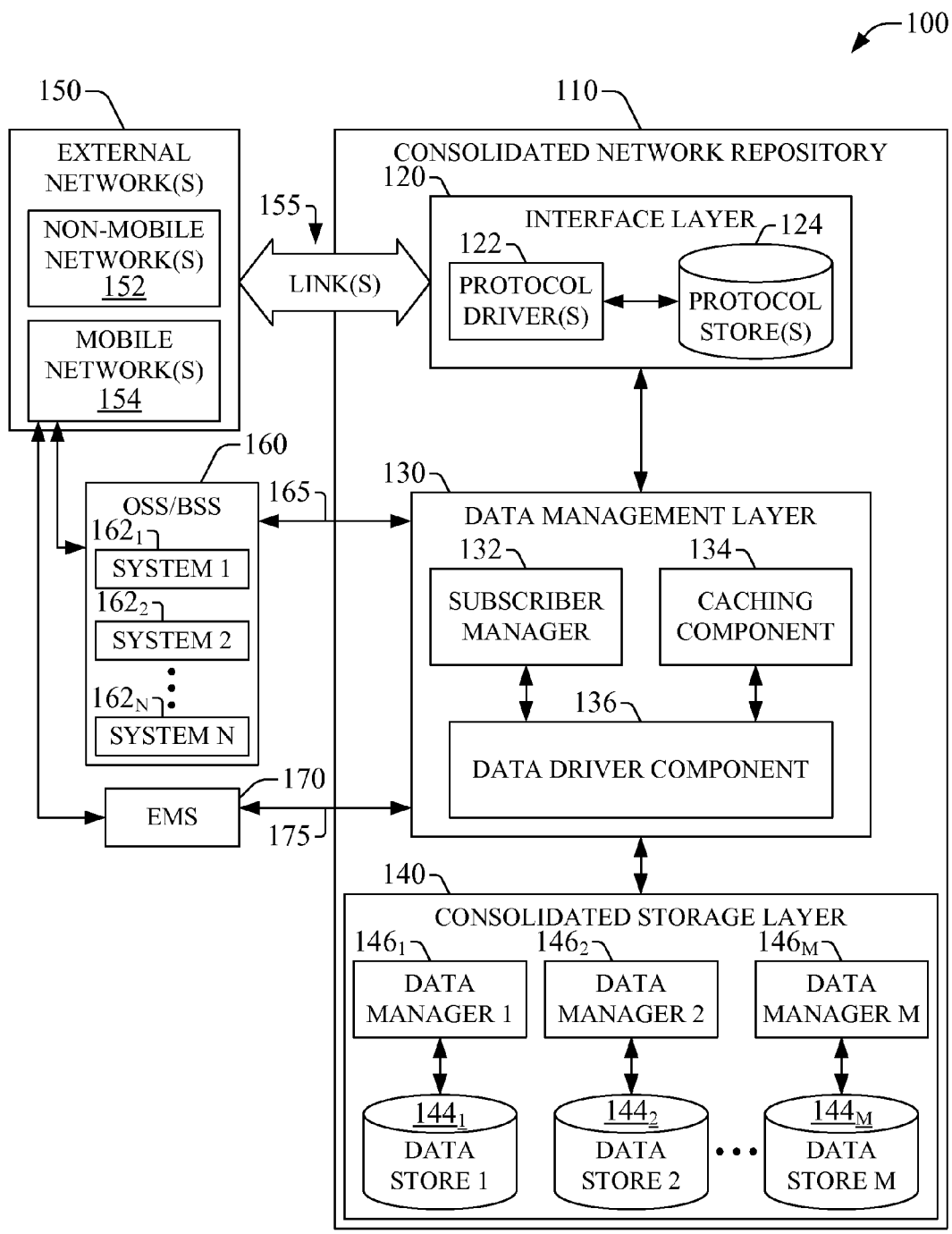
FIG. 1 is a block diagram of a consolidated network repository in which data caching can be implemented in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in this application, the terms "component," "system," "platform," "layer," "node," "selector," "interface," and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, coder, decoder, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

As described in greater detail below, system(s) and method(s) are provided for caching data in a consolidated network repository of information available to mobile and non-mobile networks, and network management systems. Data can be cached in response to request(s) for a data element or request(s) for an update to a data element and in accordance with a cache retention protocol. Request(s) for a data element of an update to a data element can be received from a set of external networks, mobile or otherwise, that interface a protocol layer. The protocol layer includes various signaling protocols associated with various network components and services, and application data. The protocol layer delivers the request(s) to a data management layer in a format compatible with the source (network component, application server, etc.) of the request(s). The data management layer format the request in accordance with a predetermined signaling protocol and allows caching, as well as other data storage functionality in accordance with the predetermined protocol. Data management layer is functionally coupled to a consolidate storage layer, which is a distributed, heterogeneous data storage. The consolidated storage layer includes all or substantially all network data that can be access or generated by network components or application servers that can access the protocol layer or interface layer. In addition, consolidated storage layer also can include data related to network management systems, and components therein; such systems functionally coupled to the data manager layer.

With respect to caching, the cache retention establishes a versioning protocol and a set of timers that determine a period to elapse prior to removal of a version of the cached data element. In addition, a master record of a data element can be updated with a most recent version of cached data element if a retention timer expires. Updates to a cached data element can be effected if an integrity assessment determines that recordation of an updated version of the data element preserves operational integrity of one or more network components or services. The assessment is based on integrity logic that establishes a set of rules that evaluate operational integrity of a requested update to a data element. Retention protocol and integrity logic are configurable; a network component can supply a configuration or such configuration can be effected autonomously.

With reference to the drawings, FIG. 1 is a block diagram of a consolidated network repository in which data can be stored temporarily in a data cache in accordance with aspects described herein. Consolidated network repository 110 is functionally coupled to external network(s) 150, which can include a set of one or more non-mobile network(s) 152 and a set of one or more mobile networks 154. Non-mobile network(s) 152 can include substantially any wireline network, such as broadband network(s), cable network(s), conventional Public Switched Telephone Network(s) (PSTN(s)), or packet-based wireline network(s), e.g., Internet Protocol Multimedia Subsystem (IMS) network; in an aspect, non-mobile network(s) 152 can be deployed within a common architecture that can provide real-time service(s) (e.g., Common Architecture for Real-Time Services (CARTS)). Mobile network(s) 154 can include one or more telecommunication networks, and various components therein, that operate in accordance with one or more radio technologies, e.g., 2G technology, 3G technology, and all-packet networks (e.g., Evolved Packet Core (EPC) such as those based on 4G technology. Link(s) 155 enable access of external network(s) 150, and sets of networks therein, to consolidated network repository 110 and information therein. Link(s) 155 can include conventional links and reference links, which are specific to the external network that is functionally connected to interface layer 120.

In addition, for mobile network(s) 154, provisioning system(s), such as Operational Support Systems/Business Support Systems (OSS/BSS) 160, and network management system(s), e.g., Element Management System(s) 170, can be functionally coupled to and exchange information (e.g., data and signaling) with the consolidated network repository 110. OSS/BSS 160 can include a set of back-end (e.g., information technology (IT)) systems $162_1$-$162_N$, and associated applications, that can provision various services enabled through one or more of mobile network(s) 154; as an example, such services can include Consumer Voice-over-IP (CVoIP), Business VoIP (BVoIP), and mobility provisioning. Network management system(s), e.g., EMS 170, and associated applications, can provide service such as activation, security, mediation, and billing services.

Consolidated network repository 110 is a distributed repository of information and associated management components that form a single logical network node that can support various network-based data storage functionality related to external network(s) 150 and application(s) therein. To support such functionality, consolidated network repository 110 includes three operational layers: (i) Interface layer 120, (ii) data management layer 130, and (iii) consolidated storage layer 140. Interface layer 120. —This layer is also termed herein frontend interface layer 110 and is the boundary between consolidated network repository 110 and external network(s) 150, and application(s) or service(s) therein, that require data storage and management thereof provided by consolidated network repository 110. Interface layer 102 is a data-less or substantially data-less operational layer in that it conveys all received data, or data payloads, associated with request for data or updates thereof to data management layer 130 for processing. Interface layer 102 also can provide a set of interfaces that match existing network data interfaces, which can allow efficient data integration of consolidated network repository 110 with external network(s) 150. The set of interfaces can be configurable and extensible; thus, providing sustainable flexibility to accommodate modifications to communication protocols employed by deployed network data interfaces. It is noted that interface layer 120 provides the set for interfaces, which are mapped to existing database interfaces, without any major or substantive changes to the architecture or logic of external network(s) 150 because interface layer 120, via protocol store(s) 124, can support existing standard protocols for data interfaces. In addition, interface layer 120 also can receive and convey data in accordance with current repository guidelines of a telecommunication carrier that administers consolidated network repository 110. The set of interfaces provided by interface layer 120 can be embodied in a set of protocol driver components 122, or protocol driver(s) 122, that can implement, e.g., execute, communication of data in accordance with one or more protocol(s); such protocol(s) can be implemented by protocol driver(s) 122 through execution of code instructions retained in protocol store(s) 124. It should be noted that extensibility of interface layer 120 can be accomplished through introduction of additional protocol driver(s) 122 and related inclusion of protocol features in protocol store(s) 124.

In an aspect, such data integration afforded by interface layer 120 can have effective logical features of legacy support for existing database systems in that interface layer 120 exchanges network data or application data with external network(s) through a single data manager, embodied in data management layer 130, which can receive data in accordance with disparate protocols. As an example, interface layer 120 can logically appear as a Home Location Register (HLR) to the wireless domain, e.g., set of network component(s) the enable telecommunication, of a mobile network functionally connected to interface layer 120. As another example, for a non-mobile network such as the IMS core network, consolidate network repository can logically appear as a 3GPP Home Subscriber Server (HSS). As yet another example, consolidated network repository 110 can logically appear as an application data repository to a Schema Evolution through an extensible, Reusable and Flexible framework (SERF) layer. In another aspect, in view of its extensibility, interface layer 120 also can provide long-term support for subscriber-specific data originated or terminated in network services and network applications.

Data management layer 130. —This layer interfaces external network services or applications through interface layer 120. Data management layer 130 can receive request(s) for data, or update(s) thereof, from and return associated responses to interface layer 120. Data management layer 130 also can submit request(s) for data element(s) (subscriber profile(s), billing configuration(s), authentication credential(s) for subscriber(s), support data for application(s), etc.) to consolidated storage layer 140. In addition, data management layer 130 also can receive response(s) from the consolidated storage layer 140. Data management layer 130 can receive such request(s) for data access and have location or routing information of database(s) that retains the requested data without effecting any frontend processing based on physical location of a subscriber associated to the request(s), network service or application that originates the request(s), or location of related data stored in database(s) within consolidated network repository 110. In an aspect, data driver component 136 can manage routing information associated with received request(s) for data or updates thereof.

Data management layer 130 also can afford exchange of data amongst interface layer 120 and consolidated storage layer 140 in accordance with a common schema or protocol. In an aspect, data driver component 136 can convert, or adapt, data request(s) received in accordance with a first protocol to a second, pre-determined protocol format, such as to Lightweight Directory Access Protocol (LDAP). Thus, data management layer 130 can incorporate data communication schemas of various network management component(s), e.g., HLR or HSS, and application servers (ASs) into the common data schema. As an example, the first protocol can include Simple Network Management Protocol (SNMP); Lightweight Directory Access Protocol (LDAP), in which case data driver component 136 acts as a pass-through functional element; Radius; Diameter; Session Initiation Protocol (SIP); Open Mobile Alliance (OMA) Device Management (DM) protocol; GSM Mobile Application Part GSM-MAP protocol; Signaling System No. 7 protocol; SQL protocols; Technical Report 069 (TR-069) protocol, also referred to as Customer Premise Equipment (CPE) Wide Area Network (WAN) Management Protocol or CWMP); etc.

Additionally, data management layer 130 can provide various data storage functionality such as but not limited to indexing of data and data routing; in example system 100, data driver component 136 can effect such data storage functionality. In addition, data management layer 130 can implement subscriber management, e.g., registration, provisioning, activation, billing . . . , via subscriber management component 132, which can interface data management component 130 directly to OSS/BSS 160 and EMS 170, and related application(s) available to such systems. Interfaces 165 and 175 can functionally connect OSS/BSS 160 and EMS 170, respectively, to data management layer 130. Providing such lower-level interfaces to the consolidated network repository 110 allows for simpler provisioning, a greater level of redundancy and overall resilience to the consolidated network repository 100 architecture. Moreover, data management layer 130 also can provide data caching functionality, via caching component 134, in accordance with aspects described hereinafter. Data caching can reduce traffic or signaling directed to consolidate storage layer 140 and increase performance of response to received request(s) for data or updated thereof.

Consolidated storage layer 140. —This layer is also referred to herein as backend repository 140, and includes the physical storage location, e.g., data stores $144_1$-$144_M$ (M is a natural number greater or equal than unity) for all or substantially all of network data (e.g., data related to external network(s) 150) and application data. In an aspect, data stores $144_1$-$144_M$ can be distributed across various coverage regions (e.g., wireless marketplaces) of an external network (e.g., a wireless network), and thus provide for localized storage within the constraints of multiple and different localized implementations. For each data store $144_\lambda$, with $\lambda=1, 2\ldots M$, consolidated storage layer 140 includes a data manager component $146_\lambda$, also referred to as data manager $146_\lambda$, that can administer access to data and generate responses to data queries originating in upper layer(s), e.g., data management layer 130. As opposed to a localized storage paradigm, such distributed storage feature allows fast and efficient access to the localized data based at least in part on location information of a data client component (e.g., a network server or an application server) without hindering performance of access to data by remote users. Limitation(s) enforced on existing network-based storage systems (e.g., HLR, Visitor Location Register (VLR), HSS . . . ) such as the number of subscribers per repository can be enforced by localized data managers (e.g., $146_1$-$146_M$) within consolidate storage layer 140.

In an aspect, one or more of data stores $144_1$-$144_M$ can be commissioned in a conventional mated-pair configuration in which each of the one or more data stores $144_1$-$144_M$ comprises two memories, or storage devices, that replicate the stored data. Mated-pair deployment provides internal redundancy and in case one memory in the pair is unavailable, associated data manager, e.g., data manager $146_2$, manages access to memory that remains available. In addition, data retained in consolidated storage layer 140 can be replicated amongst a plurality of two or more data stores $144_1$-$144_M$; such replication can afford substantial data redundancy and data resilience, particular in instance(s) of catastrophic data unavailability. Since the plurality of two or more data stores $144_1$-$144_M$ can be deployed in disparate coverage areas of a related external network, such data replication can provide geographical redundancy.

Component(s) or node(s) within each layer of the consolidated network repository 110 can be located within the same wide area network (WAN) which enables peer-to-peer communication. This feature allows the different layered nodes to communicate with each other and perform tasks such as load balancing and data location optimization. For example, if a subscriber that operates a mobile device within mobile network(s) 154 moves from a first location to a second location, consolidated network repository 110 can detect such mobility and, in response, automatically transfer the subscriber's data to a data store (e.g., $144_2$) that supplies data to network component(s) (e.g., VLR) associated with the second location. Time constraints, such as predetermined number of days (e.g., a week, a month) in a new location, can be configured to prevent data transfers across a plurality of data stores $144_1$-$144_M$ as a result of temporary move(s) of a subscriber to a the new location.

Figure 2:
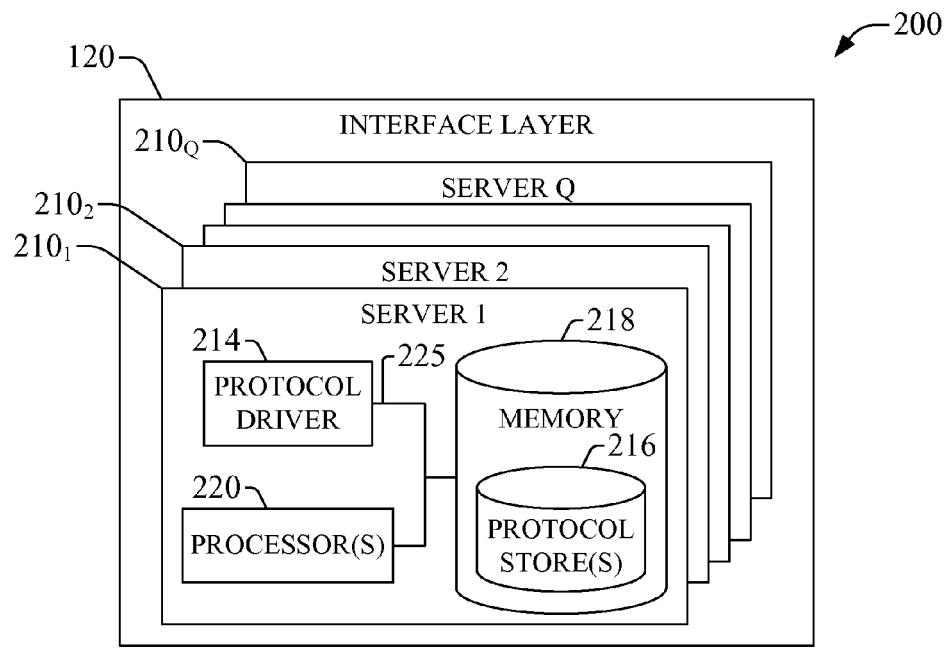
FIG. 2 is a block diagram of an example embodiment of an interface layer in a consolidated network repository in accordance with aspects described herein.

FIG. 2 is a block diagram of an example embodiment 200 of interface layer 120 in accordance with aspects described herein. In the subject embodiment, a set of Q servers $210_1$-$210_Q$, with Q a natural number greater than or equal to unity, enable the functionality of interface layer 120. Each server $210_\kappa$, $\kappa=1, 2\ldots Q$, can include a protocol driver component 214, also referred to as protocol driver 214, that can operate in the same or substantially the same manner as protocol driver(s) 122 and is functionally connected, via bus 225, to a memory 218 that includes protocol store(s) 216. Information retained in protocol store(s) 216 can be at least a portion of the information retained in protocol store(s) 124. In addition, each server 210$_K$ can include processor(s) 220, which can be configured to provide or can provide, at least in part, the described functionality of protocol driver 214. In an aspect, to provide such functionality, processor(s) 220 can exploit bus 225 to exchange data or any other information amongst protocol driver 214 and memory 218 or elements therein such as protocol store(s) 216. Bus 225 can be embodied in at least one of a memory bus, a system bus, an address bus, a message bus, a reference link, or any other conduit, protocol, or mechanism for data or information exchange among component(s). The information can include at least one of code instructions, code structure(s), data structures, or the like. Moreover, one or more servers 210$_K$ can include Input/Output interfaces (not shown) that enable, at least, networked connectivity. Processor(s) 220 also can execute code instructions (not shown) stored in memory 218 to implement or provide at least part of the described functionality of protocol driver 214. Such code instructions can include program modules or software or firmware applications that implement specific tasks which may be accomplished through one or more of the methods described in the subject specification and that are associated, at least in part, with functionality or operation of example system 100. In one or more embodiment(s), processor(s) 220 can reside within protocol driver 214 to provide described functionality thereof. Further, in some embodiments, protocol driver component 214 can reside within memory 218 as one or more sets of code instructions that, when executed by processor(s) 220, implement the protocol driver component 214 and described functionality thereof. Memory 218 can be a centralized element or a distributed element.

In an aspect, the set of servers 210$_1$-210$_Q$ can be grouped, physically or logically, into sub-sets, e.g., {210$_1$, 210$_2$ . . . 210$_J$} and {210$_{J+1}$, 210$_{J+2}$ . . . 210$_Q$} with 1≤J≤Q, each corresponding to a coverage region of external network(s) 150. Such distributed configuration can facilitate peer-to-peer communication within the region as well as load balancing amongst servers within each sub-sets. Load balancing can be effected by one or more protocol driver(s) within a sub-set in accordance with methodologies for traffic shaping or scheduling (not shown) retained in memory 218.

Figure 3:
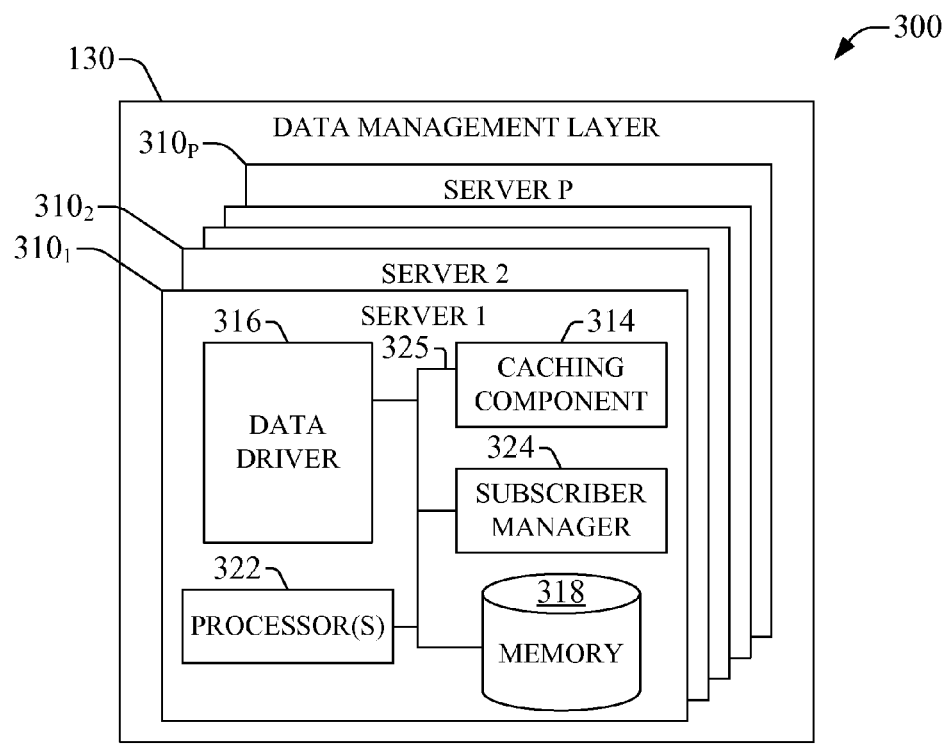
FIG. 3 is a block diagram of an example embodiment of a data management layer in a consolidated network repository in accordance with aspects described herein.

FIG. 3 is a block diagram of an example embodiment 300 of a data management layer 130 in accordance with aspects described herein. In the subject embodiment, a set of P servers 310$_1$-310$_P$, with P a natural number greater than or equal to unity, enable the functionality of data management layer 120. Each server 310$_\gamma$, γ=1, 2 . . . P, can include a data driver component 316, also referred to as data driver 316, that can operate in the same or substantially the same manner as data driver 136. Each server 310$_\gamma$ also includes a subscriber manager component 324, also termed herein subscriber manager 324, that has the same or substantially the same functionality as subscriber manager 132. A caching component 314 is also included in each server 210$_\gamma$; the caching component 314 can operate in the same or substantially the same manner as caching component 134. To exchange information, such as data and signaling, related to operation of data management layer 130, data driver 316, caching component 314, and subscriber manager 324 are functionally connected to a memory 318 via bus 325. Memory 318 can be a centralized element or a distributed element.

In addition, each server 310$_\gamma$ can include processor(s) 322, which can be configured to provide or can provide, at least in part, the described functionality of at least one of data driver 316, caching component 314, or subscriber manager 324. In an aspect, to provide such functionality, processor(s) 322 can exploit bus 325 to exchange data or any other information amongst one or more of data driver 316, caching component 314, and subscriber manager 324, and memory 318 or elements therein. Bus 325 can be embodied in at least one of a memory bus, a system bus, an address bus, a message bus, a reference link, or any other conduit, protocol, or mechanism for data or information exchange among component(s). The information can include at least one of code instructions, code structure(s), data structures, or the like. Moreover, one or more servers 310$_\gamma$ can include Input/Output interfaces (not shown) that enable, at least, networked connectivity. Processor(s) 322 also can execute code instructions (not shown) stored in memory 318 to implement or provide at least part of the described functionality of data driver 316, caching component 314, and subscriber manager 324. Such code instructions can include program modules or software or firmware applications that implement specific tasks which can be accomplished through one or more of the methods described in the subject specification and that are associated, at least in part, with functionality or operation of example system 100. In one or more embodiment(s), processor(s) 322 can be distributed amongst one or more components in server 310$_\gamma$. Further, in some embodiments, at least one of data driver component 316, caching component 314, or subscriber manager component 324 can reside within memory 318 as one or more sets of code instructions that, when executed by processor(s) 322, implement such components and described functionality thereof.

As described in connection with interface layer 120, in an aspect, the set of servers 310$_1$-310$_P$ can be grouped, physically or logically, into sub-sets, e.g., {310$_1$, 310$_2$ . . . 310$_S$}, {310$_{S+1}$, 310$_{S+2}$ . . . 310$_J$} and {310$_{J+1}$, 310$_{J+2}$ . . . 310$_P$} with 1≤S=J≤P, each corresponding to a coverage region of external network(s) 150. Such distributed configuration can facilitate peer-to-peer communication within the region as well as load balancing amongst servers within each sub-sets. Load balancing can be effected by one or more data driver(s) 316 within a sub-set in accordance with methodologies for traffic shaping or scheduling (not shown) retained in memory 318.

Figure 4:
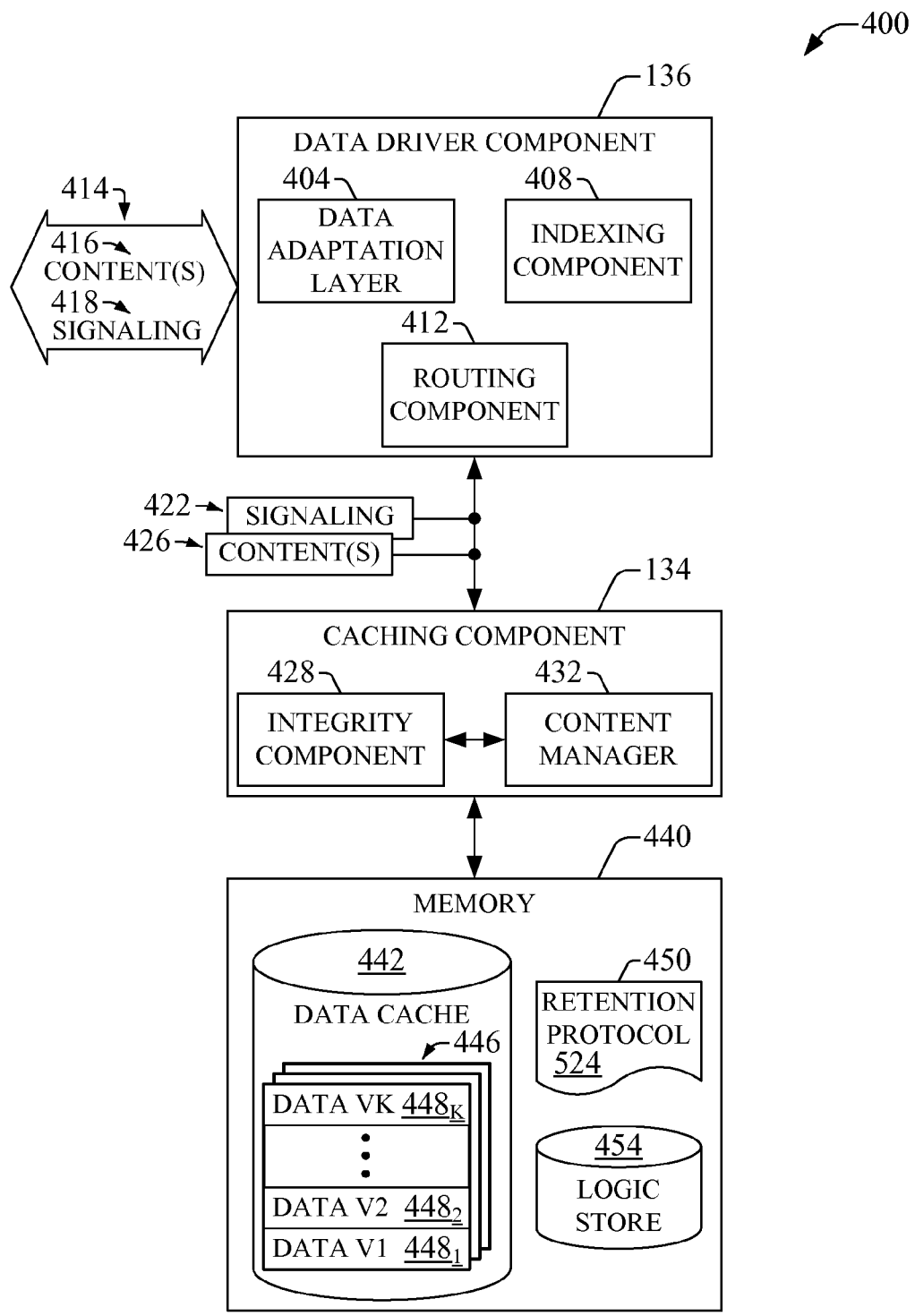
FIG. 4 is a block diagram of an embodiment of data management layer 130 in accordance with aspects described herein.

FIG. 4 is a block diagram of an embodiment 400 of data management layer 130 in accordance with aspects described herein. Data driver component 136 receives request(s) for a data element (e.g., a subscriber profile) or updates thereof. In view of the consolidated aspect of consolidated network repository 110, the request(s) for a data element or update thereof can originate from at least one of a network component (e.g., a VLR, HLR, HSS, Mobile Switching Center (MSC), a functional element in OSS/BSS 160 or EMS 170 . . . ) or an application server. In one or more network embodiments, such request(s) can be relayed, or routed, through a service control platform (SCP), a session border controller (SBC in IMS), or the like. Signaling 418 transports the request(s) for data or updates thereof and is received at data driver component 136 through link(s) 414 that functionally connect data driver component 136 to a protocol driver (e.g., a GSM-MAP protocol driver) in interface layer 120. Link(s) 414 also functionally couple data driver component 136 to consolidated storage layer 140, and functional elements therein. Request(s) for data element updates can include payload data that are at least part of the requested update; such payload data can be transported through content(s) 416. Data adaptation layer 404 can format the received signaling associated with the request(s) for data element or update(s) thereof to a common signaling protocol, such as LDAP, and delivers the formatted request(s) for data element or update thereof to caching component 134. The formatted request(s) for data element or updates thereof can be conveyed as part of signaling 422. Data adaptation layer 404 can receive a response to the request(s) for data or updates thereof through from caching component 134 via signaling 422, and can relay the response to interface layer 120 (not shown) through link 414 as part of at least one of content(s) 416 or signaling 418.

Caching component 134 receives the request(s) for data element or updates thereof and determines if the requested data element is available in data cache 442 within memory 440. In an aspect, content manager 432, also referred herein as content manager component 432, can effect such determination; to at least that end, content manager 432 can probe, e.g., poll, content(s) of data cache 442. If the requested data element is determined to be available, caching component 134 can deliver the requested data element through at least one of signaling 422 or content(s) 426. In the alternative, if the element is determined not to be available within the data cache 442, caching component 134, via, for example, content manager 432, can deliver a directive to retrieve the data element from consolidated storage layer 140. In aspect, caching component 134 can deliver such directive to indexing component 408; the directive can be part of signaling 422. Indexing component 408 can identify a storage location, e.g., a logical address such as an IP address, in which the requested data element resides and deliver a request for the data element, and associated location, to routing component 412, which conveys the request to consolidated storage layer 140. Routing component 412 can convey the request as part of signaling 418. A data manager component (e.g., $146_2$) that administers data in the location identified by indexing component 408 can receive the request delivered by routing component 412; the data manager attempts to retrieve the requested data element from data storage (e.g., $144_2$). If retrieval is successful, the data manager (not shown in FIG. 4) delivers the requested data element; conversely, it delivers failure signaling. The requested data delivered by the data manager can be part of content(s) 416 while failure signaling can be included in signaling 418. Routing component 412 receives the requested data element from consolidated storage layer (not shown in FIG. 4) and transmits the requested data element to indexing component 408, which delivers such data to caching component 134. In turn, caching component 134 can supply the received data element to data adaptation layer 404, which can format the data element in accordance with a communication protocol employed by network component(s) that originated the request(s) for data and can relay the date element to interface layer 120 in response to the request(s) for data. Interface layer 120 communicates the data element to one or more network components that originate the request(s), and such network component(s) can supply the data element to an end user (e.g., a mobile device). It should be appreciated that the date element can be routed amongst network components as part of delivery to the end user. For example, a STP can receive the data element from interface layer 120 and route the date element to a VLR, which can retain the data element for a predetermined period and supply the data element to a MSC, which in turn can convey the data element to a radio access network (RAN) component for delivery to a mobile device of the end user.

Prior to delivery of data in response to the request(s) for data communicated by interface layer 120 (not shown), caching component 134 can record the data element in data cache 442. Caching component 134, via, for example, content manager 432, can record a data element received from consolidated storage layer in accordance with a cache retention protocol, which can be stored in memory element 450. Cache retention protocol 450, and features thereof, can be configured by a telecommunication carrier administrator, via a network management component, such as a Network Operations Center (NOC), that can be part of OSS/BSS 160 or EMS 170. Such configuration can be accomplished remotely through links 165 or 175, which can enable a remote access terminal to access memory 440. In addition, configuration of cache retention protocol also can be implemented autonomously by an intelligent component (not shown) within caching component 134; in an aspect autonomous implementation can be effected through AI techniques indicated herein. In an aspect, configuration of cache retention protocol can include receiving at least a portion of the protocol as code instructions that are part of a script (e.g., an XML-based script, a Perl script, etc.) or program module.

Cache retention protocol can dictate at least one of versioning protocol of the cached data or time interval(s), or timer(s), to retain the data element or version associated therewith. In an aspect, versioning protocol can dictate recordation of a version of the data element for each instance in which the data element requested by at least one of a network component or application server is retrieved from consolidated storage layer. As an example, a set of K versions $448_1$-$448_K$ of data are illustrated as part of memory element(s) 446, wherein K is a natural number greater or equal than unity. As a feature of versioning protocol, retention protocol can dictate removal of one or more prior versions of a recorded data element if a new version of the data is recorded in data cache 442. In another aspect, the timer(s), or retention time interval(s), can be universal: the value of the timer is independent of aspects of the date element, such as data element size, type, or the like. In addition or in the alternative, magnitude of retention time interval(s) can be based at least in part on such aspects of the data element: For instance, small-size data element(s) can be retained for a longer period since such elements can occupy smaller portion of the data cache. Accordingly, through configuration of retention time interval(s), efficiency of cached data can be adjusted in accordance with predetermined performance criteria. In yet another aspect, a retention time interval(s) can determine a period that has to elapse prior to recordation of the latest version of a data element, e.g., data VK $448_K$, as a master record of the data element within consolidated storage layer 140; content manager 432 can retain the master record in the consolidated storage layer 140.

With respect to received request(s) to update data element(s), data driver component 136 can determine if the data element(s) to be updated are available in data cache 442, e.g., within memory element 446. Availability of the data element can be based on at least one of physical availability or logical availability. Physical availability is determined by an extant recordation (e.g., $448_K$) of the data element in the data cache 442, e.g., caching component 134 has previously cached a version of the data element. This determination can be implemented by polling the data cache. In the alternative, logical availability can be determined by at least one of (a) avoidance of data collision(s) amongst a recorded version of the data element that is accessed or scheduled to be accessed by a network component or application server and the updated version of the data element, (b) enforcement of location-based consistency of the data element(s); or (c) enforcement of time-based consistency of the data element(s), e.g., an update that retrogrades a previous update renders the data element(s) logically unavailable. If the data element(s) to be updated is physically unavailable, data driver component 136, e.g., via routing component 412, routes the update request, and any update payload therein, to consolidated storage layer. In the alternative, if the data element(s) to be updated are logically unavailable, data driver component 136 can implement a retry cycle in an attempt to reach a collision-free condition in which the data element(s) become logically available. In addition, if the data element(s) to be updated are unavailable, the requested update can be declined and a source of the update request can be notified accordingly. If a determination is made that data element(s) to be updated is available, data driver component 136, via, for example, data adaptation layer 404, can submit a directive to record in data cache 442 an updated version of the data element(s) in accordance at least in part with at least one of payload associated with the update request or a cache retention protocol.

Since various network elements (e.g., network component(s) or application server(s)) at various regions in the network can supply an update or update request for a data element, caching component 134 also can include an integrity component 428 that assesses operational consistency of received request(s) for update(s) to a data element. Such an assessment is based at least in part on configurable integrity logic retained in logic store 454, and can mitigate, at least in part, recordation in data cache 442 of updates of the data element that can affect adversely operational features of a network service or application traffic supplied to a subscriber. In an aspect, integrity logic can be configured by a telecommunication carrier that exploits consolidated network repository 110. In an aspect, configuration of the integrity logic can include receiving at least a portion of the protocol as code instructions that are part of a script (e.g., an XML-based script, a Perl script, etc.) or program module. The following scenario illustrates application of assessment of operational consistency: If a provisioning server classifies a business subscriber as a consumer subscriber and submits a related update to a subscriber profile, another received update to the subscriber profile that augments a QoS indicator for traffic associated with the consumer can be assessed as non-viable if the augmented QoS indicator is incompatible with the consumer subscriber re-classification.

Integrity logic retained in logic store 450 can include a set of rules that when applied to a requested data update, e.g., executed, by integrity component 428 can determine an integrity score, which can be numeric or logic, for the requested update. An integrity score above a pre-determined threshold indicates integral operation. In such case, a request to update a data element can be implemented by caching component 134, e.g., through content manager 432; wherein the implementation includes generation of an updated version of the data element and recordation of the updated data element in data cache 442 in accordance at least in part to a cache retention protocol. For integrity score(s) below threshold, caching component 134 can implement exception handling, which can include delivery of a notification of non-integral update request and recordation of the below-threshold integrity score in an update log. In an aspect, to establish an integrity score, the set of rules can correlate various values amongst data elements that can depend on requested updated value(s) of a data element that is to be updated.

In an aspect of the subject disclosure, integrity logic similar or substantially the same as the previously discussed logic can be utilized by one or more data managers (e.g., $146_1$-$146_M$) to control request(s) for data that, if fulfilled, can affect master record(s) of data element(s) retained in consolidated storage layer 140. For instance, deny or discard requested updates, or changes, to a data element as deemed appropriate based on integrity logic (e.g., score of request for update is above threshold for integral update).

It should be appreciated that request(s) or directive delivered by caching component 134 or routing component 412 can be formatted in accordance with the common signaling protocol (e.g., LDAP) to which data adaptation layer 404 formats request(s) received from interface layer 120.

Various aspects of the subject disclosure can be automated through artificial intelligence (AI) methods to infer (e.g., reason and draw a conclusion based upon a set of metrics, arguments, or known outcomes in controlled scenarios), for example, features of cache retention protocol such as retention timer(s) or data transfer amongst various data stores within the consolidated storage layer. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., historical data on access to specific groups or types of data element(s), or subscriber mobility and associated visitation patterns to various locations within a telecommunication carrier network. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

In view of the example system(s) described above, example method(s) that can be implemented in accordance with the disclosed subject matter can be better appreciated with reference to flowcharts in FIGS. 5-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages described herein. It should be further appreciated that the example methods disclosed throughout the subject specification are capable of being stored on an article of manufacture to facilitate transporting and transferring such example methods to computers for execution, and thus implementation, by a processor or for storage in a memory.

Methods disclosed throughout the subject specification and annexed drawings are capable of being stored on an article of manufacture to facilitate transporting and transferring such methodologies to computers for execution, and thus implementation, by a processor or for storage in a memory. In an aspect, one or more processors that enact method(s) described herein can be employed to execute code instructions retained in a memory, or any computer- or machine-readable medium, to implement method(s) described herein;

the code instructions, when executed by the one or more processor implement or carry out the various acts in the method(s) described herein. The code instructions provide a computer- or machine-executable framework to enact the method(s) described herein.

Figure 5:
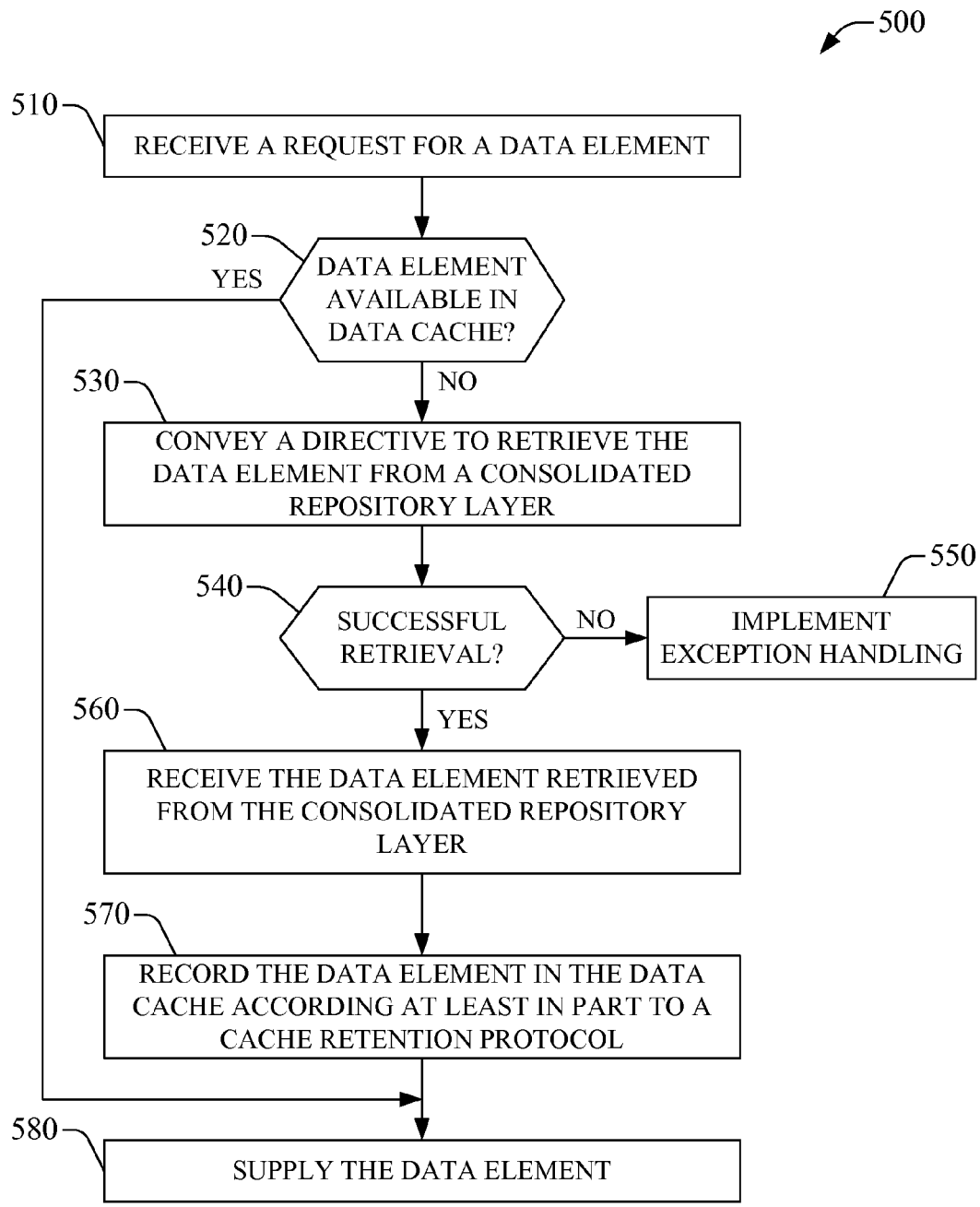
FIG. 5 is a flowchart of an example method for caching data according to aspects described herein.

FIG. 5 is a flowchart of an example method for caching data according to aspects described herein. In an aspect, one or more components (e.g., caching component 134) that is part of a data management layer within consolidated network repository described herein can enact the subject example method. In another aspect, one or more processors configured to provide or that provide at least part of the functionality to component (e.g., caching component 134) also can enact, at least in part, the subject example method 500. In a further aspect, one or more processors that execute the one or more components (e.g., caching component 134) or a set of code instructions that implements the one or more components, and associated functionality, also can enact the subject example method. At act 510, a request for a data element is received. The request originates in at least one of an application server or a network component. The application server and the network component reside in higher network layer(s) than the data management layer. The network component can originate the request for data as part of service(s) provided to a subscriber, the service(s) can include location area update (LAU) process in UMTS-based radio network technology, media exchange service such as video exchange, music exchange, photo exchange; banking service, ecommerce service, IPTV broadcast, email service, VoIP communication . . . . Request(s) for data originated in the application server can arise because of a device, mobile or otherwise, consumes a specific service; or a network management component provisions a service or executes a service, such as a location based service, a billing application, or an authentication protocol.

At act 520, it is determined if the requested data element is available in data cache; wherein the data cache (e.g., memory element 442) resides in a memory within the data management layer. In an aspect, a sub-component (e.g., content manager 432) of the one or more components that enact the subject method can effect the determination by probing, e.g., polling, content(s) of the data cache. If determined that the requested data element is available, flow is directed to act 580, in which the data element is supplied. In the alternative, if the data element is determined to be unavailable, a directive to retrieve the data element from a consolidated storage layer (e.g., 140) is conveyed at act 530. Successful retrieval of the data element is determined at act 540 and exception handling is implemented at act 550 in case such retrieval fails. Conversely, the data element retrieved from the consolidated repository layer is received at act 560.

At act 570, the data element is recorded according at least in part to a cache retention protocol. In an aspect, as described supra, the retention protocol can be retained within a memory that includes the data cache. Recording the data element can include generating a version identifier (e.g., a number, code, or any token) for the data element and issuing a time stamp for the generated version of the data element in order to initiate a timer associated with the generated version. In an aspect, retention protocol can dictate removal of older version(s) of a data element if a current version is generated; removal can occur upon generation of the current version or after a predetermined period has elapsed since generation of the current version.

Figure 6:
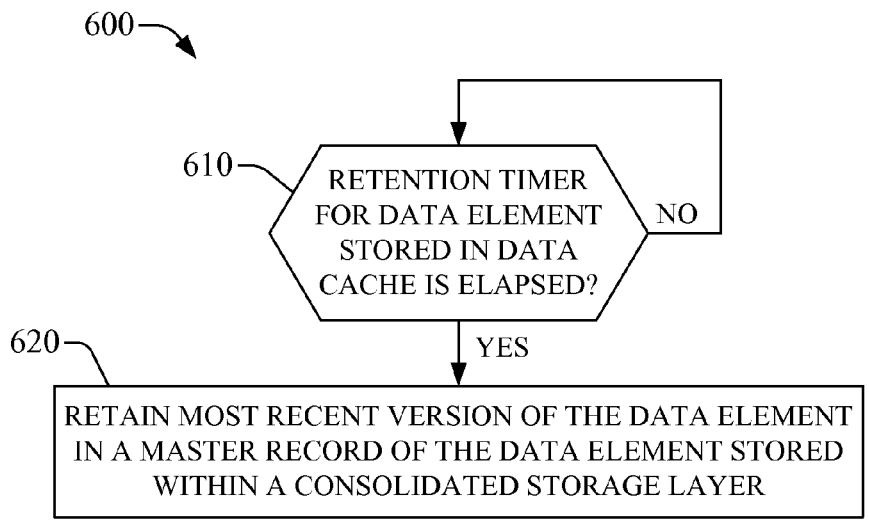
FIG. 6 is a flowchart of an example method for managing cached data according to aspects described herein.

FIG. 6 is a flowchart of an example method 600 for managing cached data according to aspects described herein. Component(s) or processor(s) that enact example method 500 also can enact the subject example method 600. In an aspect, the subject example method can be performed as part of act 570. At act 610, it is probed if a retention timer for a data element stored in data cache (e.g., memory element 442) is elapsed. A negative outcome results re-directs flow to act 610 for further probing. Conversely, at act 620, most recent version of the data element is retained in a master record of the data element within a consolidated storage layer (e.g., 140).

Figure 7:
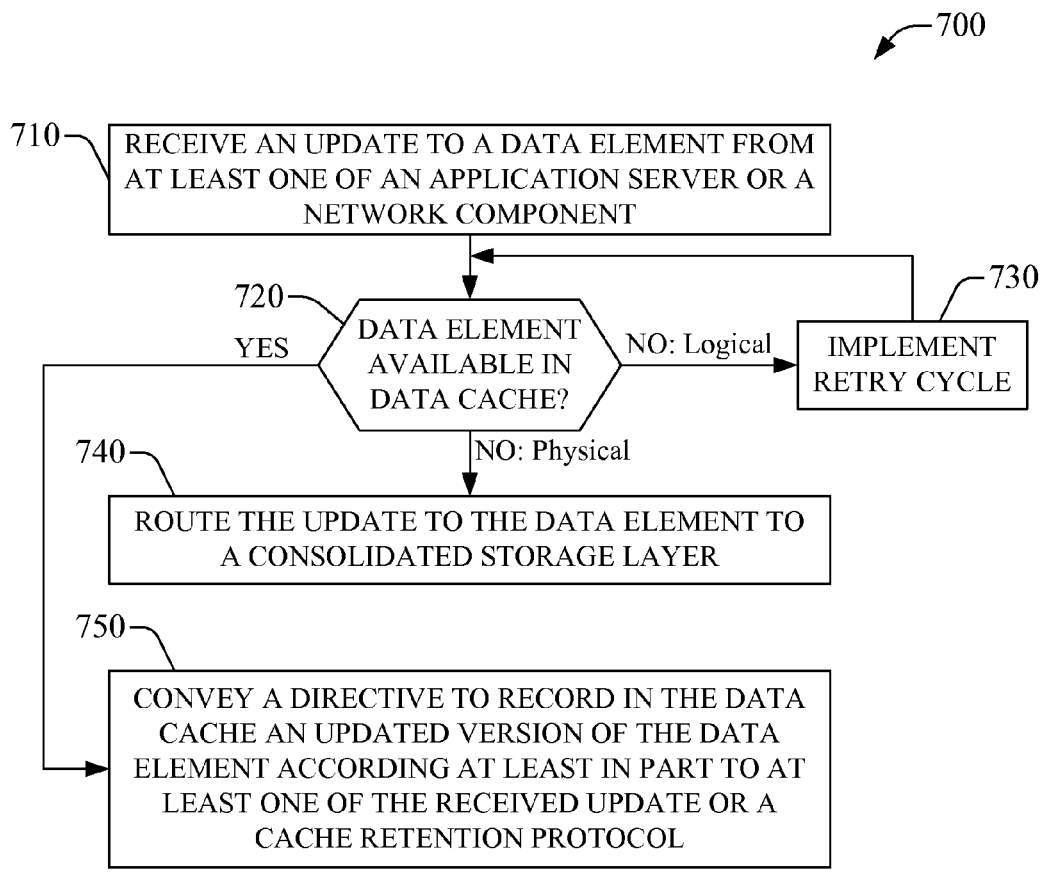
FIGS. 7-8 present flowcharts of additional or alternative example methods for caching data according to aspects described herein.

FIG. 7 is a flowchart of an example method 700 for caching data according to aspects described herein. Component(s) or processor(s) that enact example method 700 also can enact the subject example method 700: For example, data driver component 136, or one or more components therein, can enact the subject example method. At act 710, an update to a data element is received from at least one of an application server or a network component. As an example, an Authorization, Authentication and Accounting (AAA) server, which can be part of OSS/BSS 218, can supply an updated billing scheme for a subscriber, e.g., free airtime minutes for telecommunication through a femtocell access point. As another example, a subscriber profile can be updated to reflect change(s) to a quality of service (QoS) for specific traffic consumed by the subscriber; such update can be supplied (e.g., effected and delivered) by a provisioning server that can be part of EMS 170. At act 720, it is established if the data element is available in data cache. Availability of the data element can be based on at least one of physical availability or logical availability, as described supra. In case the data element is logically unavailable, at act 730, a retry cycle is implemented (e.g., a set of one or more attempts are made to probe availability of the data element prior to causing exception, or error, signaling) at act 730. In case the data element is physically unavailable in the data cache (e.g., memory element 442), at act 740, the update to the data element is routed to a consolidated storage layer (e.g., 140). Conversely, when the data element is available, a directive is conveyed to record in the data cache an updated version of the data element according at least in part to at least one of the received update or a retention protocol at act 740.

Figure 8:
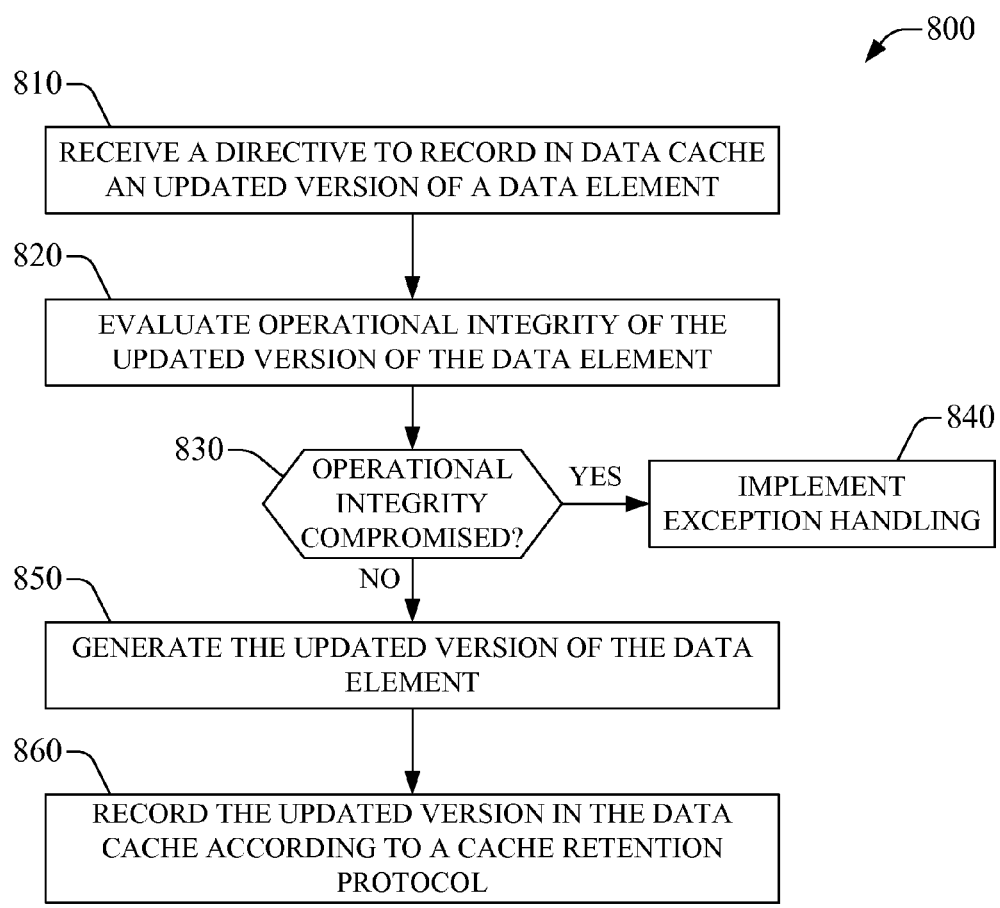

FIG. 8 is a flowchart of an example method 800 for caching data according to aspects described herein. The subject example method can be effected in conjunction with or as complement to example method 700. In an aspect, the subject example method can be performed by a caching component (e.g., 134), or one or more components therein. In addition or as alternative, one or more processor(s) can enact the subject example method 800; the one or more processor(s) provide at least part of the functionality of the caching component, or can execute the caching component or a set of code instructions that implements the caching component, and associated functionality. At act 810, a directive to record an updated version of a data element in data cache (e.g., memory element 218) is received. In an example scenario, the directive can be received from a component in data management layer (e.g., data driver component or a component therein). Recordation of the updated version of the data element in the data cache can be dictated in accordance with cache retention protocol. At act 820, operational integrity of the updated version of the data element is evaluated. Evaluation can be conducted based at least in part on payload data in the update directed to the data element. As discussed supra, operation integrity is assessed to ensure consistent operation of the various services that can access cached data. At act 830, based on the evaluation, it is determined if operational integrity is compromised. In the affirmative case, exception handling is implemented at act 840. Conversely, if operational integrity is not compromised, the updated version of the data element is generated at act 850. At act 860, the updated version is recorded in the data cache according to a cache retention protocol.

Figure 9:
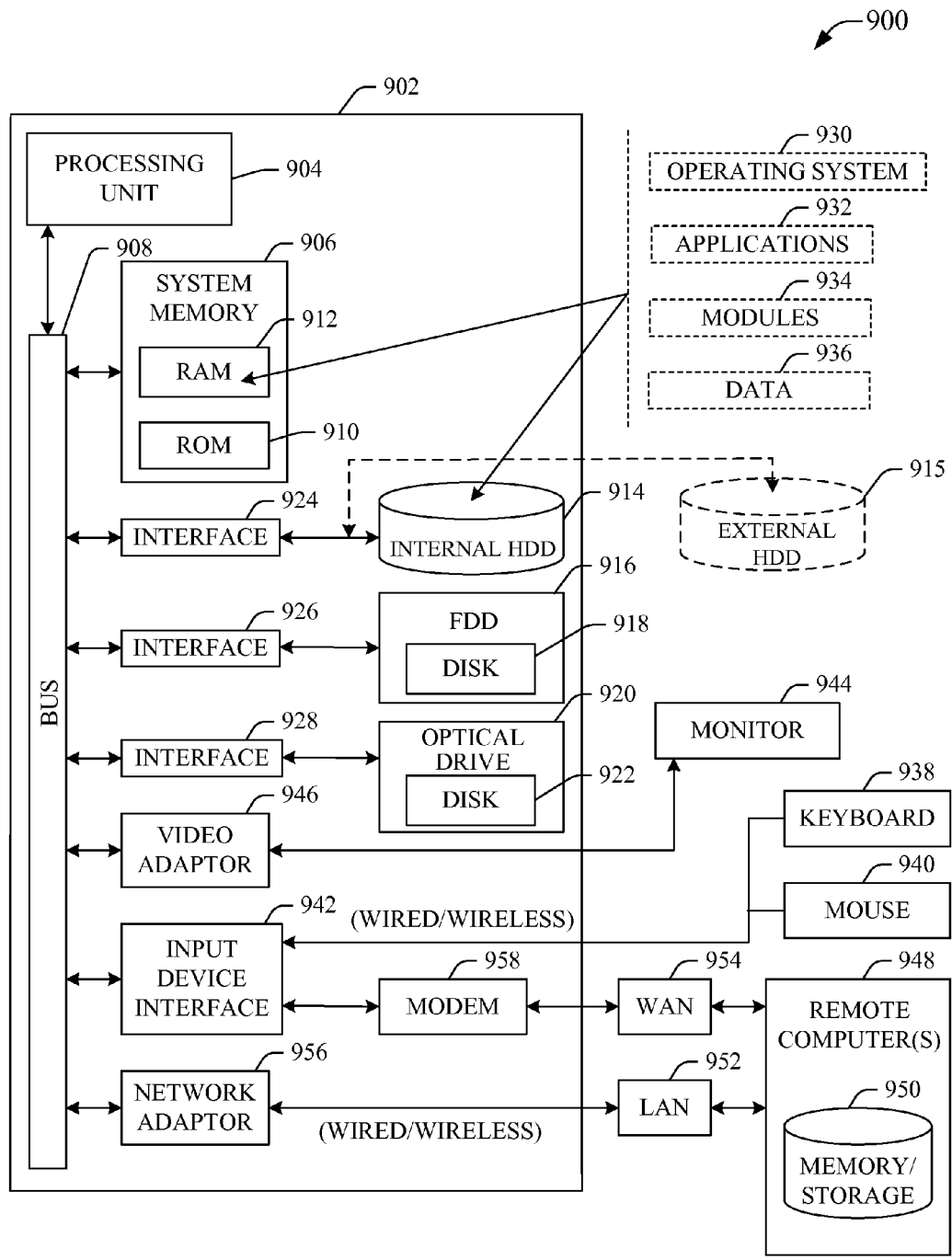
FIG. 9 illustrates an example computing environment in which the various aspects of the specification can be implemented.

In order to provide additional context for various aspects of the subject specification, FIG. 9 and the following discussion are intended to provide a brief, general description of a suitable example computing environment 900 in which the various aspects of the specification can be implemented. Example computing environment 900 can embody several of the components or layers described herein; for example, data management layer 130, interface layer 120, servers $210_1$-$210_Q$ or $310_1$-$310_P$, data manager components $146_1$-$146_M$, or the like. In addition, example computing environment 900 can enable or execute components or layers, or portions thereof, implemented as software application(s) or firmware application(s)s. Memory elements that are part of computing environment 900 can embody the various data storage described in the one or more embodiments of the subject disclosure. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the example environment 900 for implementing various aspects of the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), or an external HDD 915 can be present in addition to internal HDD 914, a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
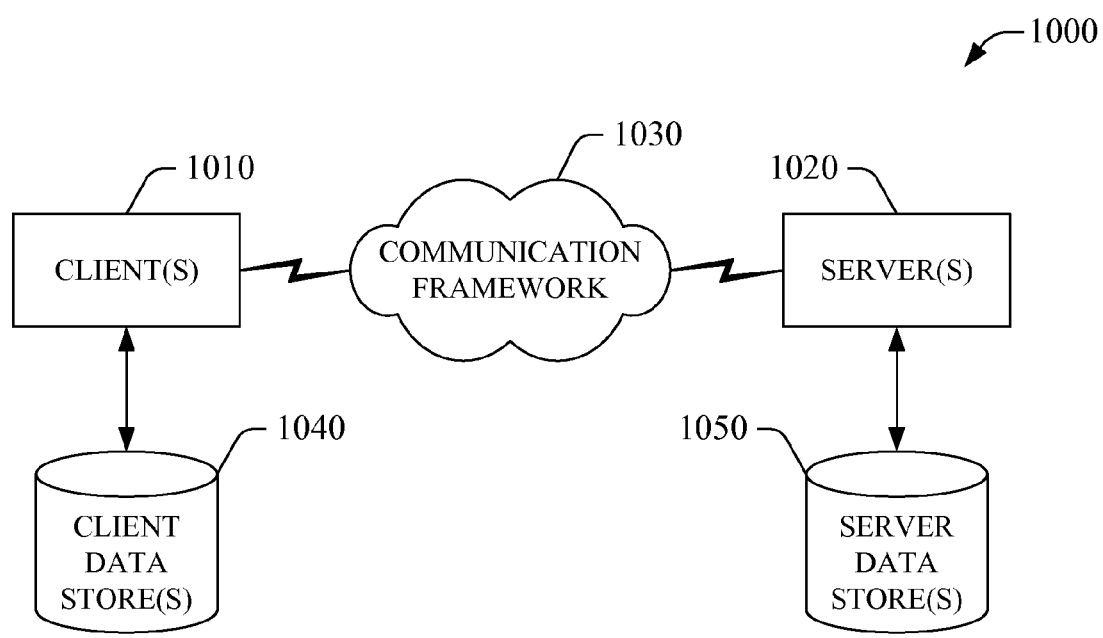
FIG. 10 illustrates a schematic block diagram of an example computing environment in accordance with aspects described herein.

FIG. 10 illustrates a schematic block diagram of an example computing environment 1030, in accordance with aspects described herein. The system 1000 includes one or more client(s) 1010. The client(s) 1010 can be hardware and/or software (e.g., threads, processes, computing devices). The system 1000 also includes one or more server(s) 1020. Thus, system 1000 can correspond to a two-tier client server model or a multi-tier model (e.g., client, middle tier server, data server), amongst other models. The server(s) 1020 can also be hardware and/or software (e.g., threads, processes, computing devices). The servers 1020 can house threads to perform transformations by employing the subject disclosure, for example. One possible communication between a client 1010 and a server 1020 may be in the form of a data packet transmitted between two or more computer processes.

The system 1000 includes a communication framework 1030 that can be employed to facilitate communications between the client(s) 1010 and the server(s) 1020. The client(s) 1010 are operatively connected to one or more client data store(s) 1040 that can be employed to store information local to the client(s) 1010. Similarly, the server(s) 1020 are operatively connected to one or more server data store(s) 1050 that can be employed to store information local to the servers 1020.

It is to be noted that aspects, features, or advantages of the subject disclosure described in the subject specification can be exploited in substantially any wireless communication technology. For instance, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the subject disclosure as disclosed in the subject specification can be exploited in legacy telecommunication technologies; e.g., GSM. In addition, mobile as well non-mobile networks (e.g., internet, data service network such as IPTV) can exploit aspect or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a system comprising a processor, a data element from a first storage layer device that consolidates storage of network data relating to networks and network components and storage of application data relating to applications in response to the data element being determined not to be present in a data cache of a second storage layer device;
   caching, by the system, the data element in the data cache of the second storage layer device according to a cache retention protocol defining a time period for retention of the data element in the second storage layer device; and
   removing, by the system, the data element from the second storage layer device after the time period has been determined to have elapsed.

2. The method of claim 1, wherein the caching further comprises generating a version identifier for the data element according to the cache retention protocol.

3. The method of claim 1, wherein the caching further comprises generating a time stamp associated with the data element.

4. The method of claim 3, further comprising initiating, by the system, a timer based on the time stamp to facilitate determining that the time period has been determined to have elapsed.

5. The method of claim 1, wherein the removing further comprises replacing the data element with a new version of the data element in the second storage layer device after the time period has been determined to have elapsed.

6. The method of claim 5, wherein the replacing further comprises:
   receiving the new version of the data element in the second storage layer device; and
   determining that the new version of the data element is a more recent version than the data element.

7. The method of claim 5, wherein the replacing further comprises evaluating a set of pre-defined rules to determine a value representing an operational integrity of the new version of the data element.

8. A system, comprising:
   a memory to store instructions; and
   a processor, coupled to the memory, that facilitates execution of the instructions to perform operations, comprising:
      retrieving a data element from a first storage layer device that consolidates storage of network data relating to networks and network components and storage of application data relating to applications in response to the data element being determined to be unavailable in a data cache of a second storage layer device;
      caching the data element in the data cache of the second storage layer device according to a cache retention protocol; and
      removing the data element from the second storage layer device in response to a condition with respect to a time period defined in the cache retention protocol being determined to be satisfied.

9. The system of claim 8, wherein the operations further comprise generating a version identifier for the data element as defined in the cache retention protocol.

10. The system of claim 8, wherein the operations further comprise generating a time stamp associated with the data element being determined to be cached in the data management storage layer.

11. The system of claim 10, wherein the operations further comprise initiating a timer to determine when the time period has elapsed based on the time stamp.

12. The system of claim 8, wherein the operations further comprise replacing the data element with a new version of the data element in the second storage layer device in response to the condition with respect to the time period defined in the cache retention protocol being determined to be satisfied.

13. The system of claim 12, wherein the operations further comprise receiving the new version of the data element in the second storage layer device and determining that the new version of the data element represents more up to date data than the data element based on a comparison of version identifiers.

14. The system of claim 12, wherein the operations further comprise evaluating an operational integrity of the new version of the data element according to a predefined function.

15. The system of claim 8, wherein the operations further comprise: processor further facilitates the execution of the computer executable instructions to at least:
   receiving a request for the data element from an interface layer device;
   retrieving the data element from the cache; and
   providing the data element to the interface layer device.

16. The system of claim 15, wherein the interface layer device is communicatively coupled to a mobile device.

17. A computer-readable storage device having instructions stored thereon that, in response to execution, cause a system comprising a processor to perform operations, comprising:
   retrieving a data element from a first device that consolidates storage of network data relating to networks and network components in response to the data element being determined not to be available in a data cache of a second device;
   caching the data element in the data cache of the second device according to a cache retention protocol; and
   removing the data element from the second device after a time period has been determined to have elapsed according to the cache retention protocol.

18. The computer-readable storage device of claim 17, wherein the operations further comprise identifying the data element with a version identifier based on the cache retention protocol.

19. The computer-readable storage device of claim 17, wherein the operations further comprise replacing the data element with a newer version of the data element in the data cache of the second device after the time period has been determined to have elapsed according to the cache retention protocol.

20. The computer-readable storage device of claim 19, wherein the operations further comprise receiving the newer version of the data element in the second device and determining that the newer version of the data element is a more recent version than the data element.

\* \* \* \* \*